Warren J. Belcher
Richard F. Dow
INVENTORS

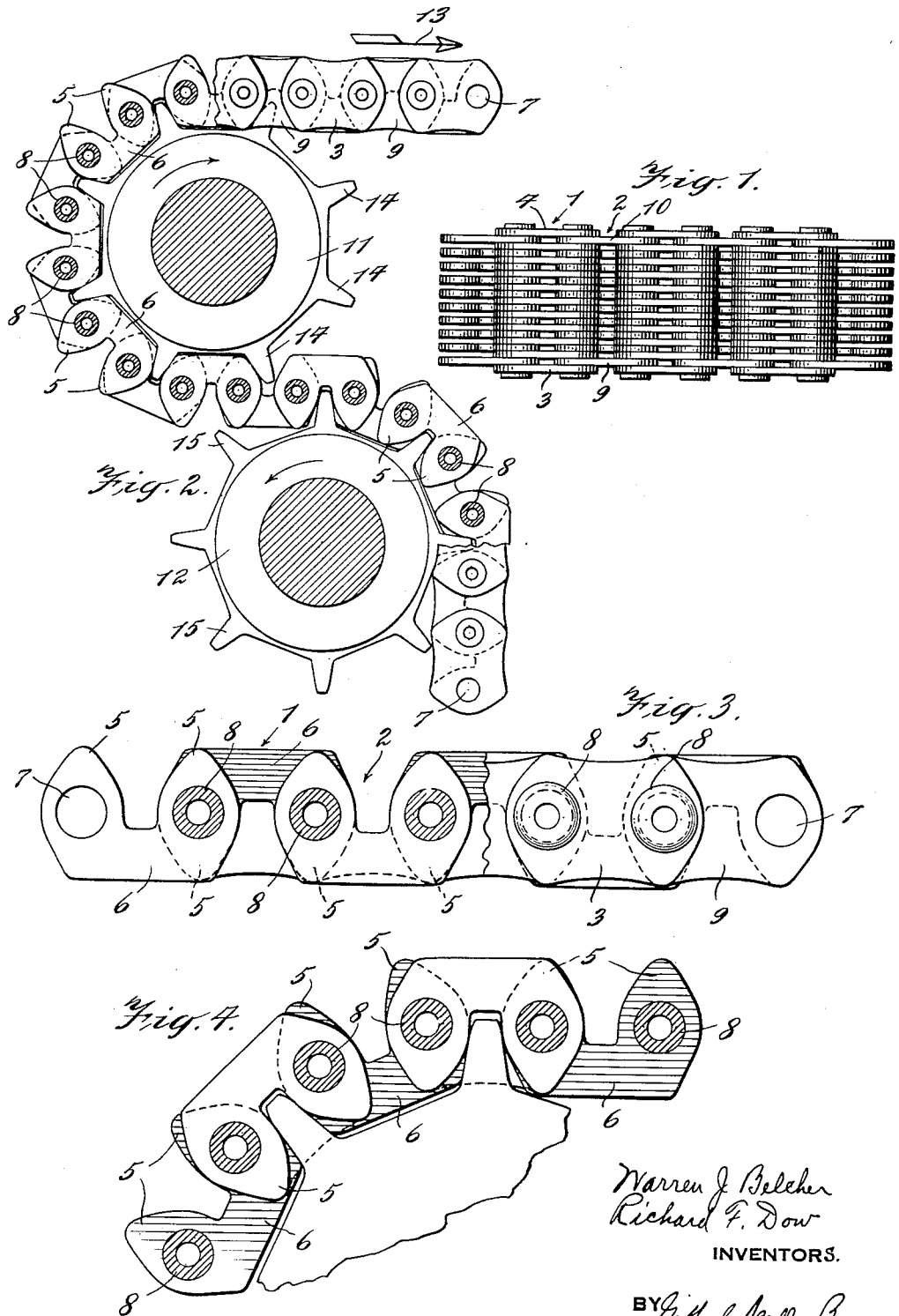

BY Gifford Scull & Burgess
ATTORNEYS.

Patented May 1, 1934

1,956,942

UNITED STATES PATENT OFFICE 1,956,942

CHAIN DRIVE AND CHAIN FOR USE THEREON

Warren J. Belcher and Richard F. Dow, Hartford, Conn., assignors to The Whitney Mfg. Co., Hartford, Conn., a corporation of Connecticut Application August 17, 1929, Serial No. 386,552

18 Claims. (Cl. 74—245)

This invention relates to a novel and improved type of chain, more particularly of the kind known as the "silent type" link chain, and the novel features will be best understood from the following description and the annexed drawings, in which we have shown selected embodiments of the invention and in which:

Fig. 1 is a plan view of a portion of chain constructed according to one form of the invention, this form having side guides, and the links being designed to have internal and external engagement with the teeth of a sprocket wheel.

Fig. 2 is a view showing this form of chain disposed on sprocket wheels.

Fig. 3 is a side elevation with parts broken away and shown in section, illustrating the construction of the chain.

Fig. 4 is a view on an enlarged scale showing this type of chain in use on a sprocket wheel.

Figure 5:
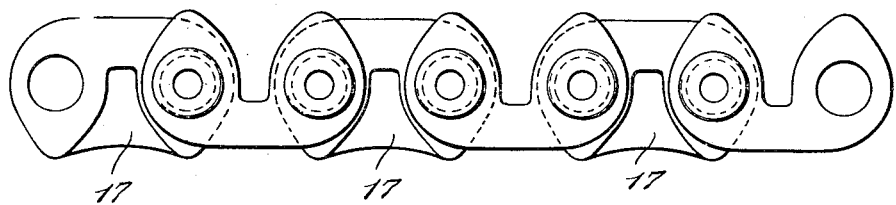
Fig. 5 is a view corresponding to Fig. 3, but showing another form which the invention may take, this form having center guides and the links being designed to have only internal engagement with the teeth of a sprocket wheel.

Referring now to Figs. 1, 2, 3 and 4, there is shown therein a chain of the so-called "silent type", in which a plurality of pitches are pivotally connected together, and in which each pitch comprises a plurality of links disposed parallel to each other, these links preferably being flat plates with the teeth formed thereon. In the form illustrated in these figures, we will consider two adjacent pitches 1 and 2.

The pitch 1 comprises two side guides 3 and 4, and, in the illustrated form, nine parallel links each having teeth extending downwardly, as viewed in Fig. 3. The links are all substantially the same in configuration, and each is preferably formed from a flat plate with two teeth 5 extending in the same direction from a connecting shank 6. The teeth are provided with holes 7 through which pass rivets 8, it being understood that the holes in links in adjoining pitches are aligned with each other to receive these rivets.

The pitch 2, in the illustrated embodiment, comprises side guides 9 and 10 similar to the guides 3 and 4, and eight links overlapping with the links on the pitch 1. Because of this overlapping arrangement, the number of links in one pitch is usually odd, and that in the adjoining pitch is usually even, and the pitches are referred to respectively as the odd and even pitches.

In the pitch designated 2, the links are formed as duplicates of those in the adjoining pitch 1, but it will be noted that the teeth extend in the opposite direction from the teeth in pitch 1. In this embodiment, the links in one pitch have internal engagement between the link teeth and the sprocket tooth, of which this pitch rests astride, whereas the backs of the links in the next adjoining pitches have external engagement with the same sprocket tooth.

For the sake of convenience, we shall refer to the horizontal plane which passes through the axes of the rivets as the longitudinal center of the chain, and it will be seen that the teeth on one pitch extend in one direction with respect to that center, while the teeth on adjoining pitches extend in the opposite direction.

The above arrangement makes possible the use of the chain on a drive such as illustrated in Fig. 2, wherein the sprocket wheels 11 and 12 are driven by the chain moving in the direction indicated by the arrow 13. This movement of the chain will cause the sprocket wheel 11 to rotate in a clockwise direction and the sprocket wheel 12 in a counter-clockwise direction, because of the fact that the chain passes between these two wheels. The chain will bend over the wheels, as illustrated, and the links in alternate pitches will rest astride the teeth 14 on the wheel 11 and have internal engagement therewith, while the links in the other alternate pitches will rest astride the teeth 15 on the wheel 12 and have internal engagement therewith, in each case the backs of the links in adjoining pitches having external engagement with these sprocket teeth.

Figure 6:
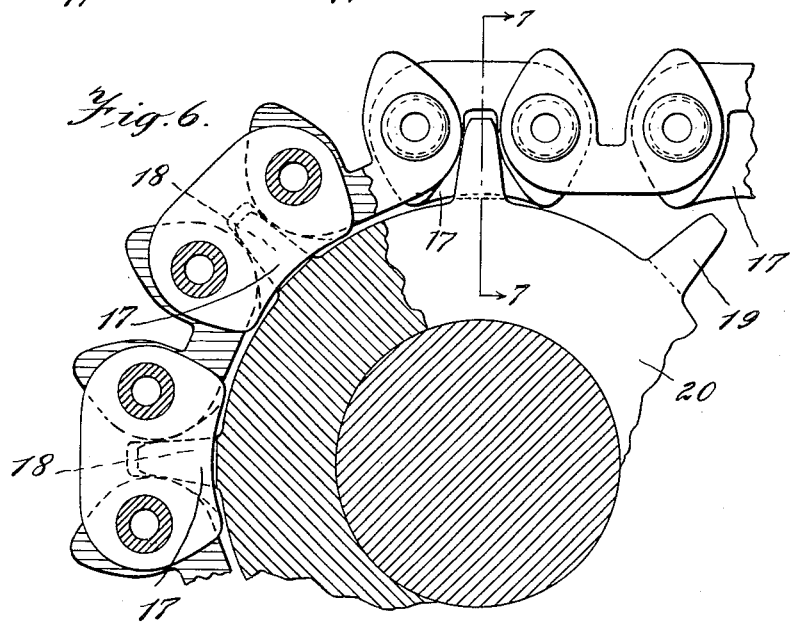
Fig. 6 is a fragmentary view of a sprocket wheel having this form of chain thereon.
Figure 7:
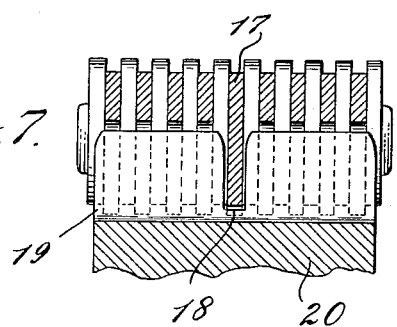
Fig. 7 is a section on the line 7—7 of Fig. 6.

Referring now to Figs. 5, 6 and 7, we have shown therein a different embodiment, in which the links of a pitch rest astride a sprocket tooth, as before, but have internal engagement only therewith. In this form, however, the links in adjoining pitches do not have external engagement with this sprocket tooth. For the sake of clearness, the links shown in Figs. 5 and 6 have been slightly distorted, so as to show an exaggerated clearance between the sprocket teeth and the backs of the links. It is to be understood that in actual practice this clearance is much less than that shown. This chain is provided with center guides 17 which are adapted to be received in recesses 18 in sprocket teeth 19 on the sprocket wheel 20. In this form, as in the other, the teeth on links in alternate pitches extend in opposite directions from the longitudinal center of the chain, and the center guide is omitted from alternate pitches. These alternate pitches which do not have the center guide are adapted to rest astride sprocket teeth of a wheel, between which and the sprocket teeth the chain may pass.

From the foregoing, it will be noted that our invention has many advantages, some of which are that all of the link elements are identical in form; no extra parts are necessary to be inserted between the elements at any point; the sprockets which are driven by the chain are of uniform construction, differing only in size; that a chain of maximum strength is produced in a minimum space; that a chain of great strength and simplicity is produced; that the chain drives sprockets of different diameters with equal quietness and efficiency; either side of the chain will drive with equal efficiency sprockets of different diameters and, therefore, it is not important which side of the chain engages a given sprocket. This eliminates the likelihood of mistakes in the application of the chain to the sprockets.

We claim:—

1. A chain composed of links arranged in articulated pitches, each pitch being composed of a plurality of links and each link having a plurality of teeth adapted to rest astride a sprocket tooth and engage both sides thereof, said chain having the teeth of all links in adjacent pitches lying on opposite sides of the longitudinal center thereof.

2. A chain having articulated links with teeth for resting astride of and engaging the sides of a sprocket tooth, the teeth of all alternate links along the chain lying on opposite sides of the longitudinal center of the chain and adapted to drive sprockets in opposite directions.

3. In a chain drive the combination of a plurality of sprockets having teeth, a link chain for driving said sprockets in different directions, said chain links having teeth adapted to rest astride the sprocket teeth they drive, the teeth of all alternate links along the chain being on opposite sides of the longitudinal center of the chain.

4. A chain comprising a plurality of links arranged in pitches, each pitch comprising a plurality of links parallel to each other and pivotally connected to the links of adjoining pitches, each link comprising a plate having teeth adapted to rest astride the teeth of a sprocket wheel, the teeth on all links in one pitch extending in one direction, and the teeth in all links in an adjacent pitch extending in the opposite direction from the longitudinal center of the chain.

5. A chain composed of links arranged in articulated pitches, each pitch being composed of a plurality of links, each link having a plurality of teeth adapted to rest astride a sprocket tooth, said chain having the teeth of links in adjacent pitches lying on opposite sides of the longitudinal center thereof, the link teeth in one pitch resting astride a sprocket tooth and having internal engagement with both sides thereof, and the links in adjoining pitches having external engagement with the same sprocket tooth.

6. A chain comprising a plurality of links arranged in pitches, each pitch comprising a plurality of links parallel to each other and pivotally connected to the links of adjoining pitches, each link comprising a plate having teeth adapted to rest astride the teeth of a sprocket wheel, the teeth on all links in one pitch extending in one direction, the teeth in all links in an adjacent pitch extending in the opposite direction from the longitudinal center of the chain, the link teeth in one pitch resting astride a sprocket tooth and having internal engagement with both sides thereof, and the links in adjoining pitches having external engagement with the same sprocket tooth.

7. A chain composed of links arranged in articulated pitches, each pitch being composed of a plurality of links, all links in one pitch having teeth adapted to rest astride the same sprocket tooth, said chain having the teeth of all links in pitches adjacent said first-named pitch lying on the side of the longitudinal center of the chain opposite those in said first-named pitch and out of engagement with said sprocket tooth.

8. A chain composed of links arranged in articulated pitches, each pitch being composed of links, each link having a plurality of teeth adapted to rest astride a sprocket tooth, said chain having the teeth of all links in adjacent pitches lying on opposite sides of the longitudinal center thereof, whereby the chain may pass between sprockets and drive the same in opposite directions, all the link teeth in each pitch resting astride a sprocket tooth and having internal engagement with both sides of said sprocket tooth, and the links in adjoining pitches being out of engagement with the same sprocket tooth.

9. A chain composed of links arranged in articulated pitches, each pitch being composed of a plurality of links, all links in one pitch having teeth adapted to rest astride the same sprocket tooth, and said chain having the teeth of all links in pitches adjacent said first-named pitch lying on the side of the longitudinal center of the chain opposite those in said first-named pitch.

10. A chain composed of links arranged in articulated pitches, each pitch being composed of links, each link having a plurality of teeth adapted to rest astride a sprocket tooth, said chain having the teeth of all links in adjacent pitches lying on opposite sides of the longitudinal center thereof, whereby the chain may pass between sprockets and drive the same in opposite directions, and all the link teeth in each pitch resting astride a sprocket tooth and having internal engagement with both sides of said sprocket tooth.

11. A chain composed of links arranged in articulated pitches, each pitch being composed of a plurality of toothed links, all the teeth in one pitch being adapted to rest astride the same sprocket tooth, said chain having all the teeth in pitches adjacent said first-named pitch lying on the side of the longitudinal center of the chain opposite those in said first-named pitch and out of engagement with said sprocket tooth.

12. A chain composed of links arranged in articulated pitches, each pitch being composed of links, each link having a plurality of teeth adapted to rest astride a sprocket tooth, said chain having the teeth of all links in adjacent pitches lying on opposite sides of the longitudinal center thereof, whereby the chain may pass between sprockets and drive the same in opposite directions, all the link teeth in each pitch resting astride a sprocket tooth and having internal engagement with both sides of said sprocket tooth, and the links in adjoining pitches having their backs engaging the same sprocket tooth.

13. In combination, a sprocket having teeth thereon, a chain comprising a plurality of pitches of toothed links, all the teeth in one pitch extending in one direction from the longitudinal center of the chain and adapted to rest astride one of said sprocket teeth, and all the teeth in adjoining pitches extending in the opposite direction from said longitudinal center and disposed between adjacent teeth of the sprocket when the chain is engaging it.

14. In combination, a sprocket having teeth thereon, a chain comprising a plurality of pitches of toothed links, all the teeth in one pitch extending in one direction from the longitudinal center of the chain and adapted to rest astride one of said sprocket teeth, and all the teeth in adjoining pitches extending in the opposite direction from said longitudinal center and disposed between adjacent teeth of the sprocket when the chain is engaging it and out of engagement with said sprocket teeth.

15. In combination, a sprocket having teeth thereon, a chain comprising a plurality of pitches of toothed links, all the teeth in one pitch extending in one direction from the longitudinal center of the chain and adapted to rest astride one of said sprocket teeth, and all the teeth in adjoining pitches extending in the opposite direction from said longitudinal center and disposed between adjacent teeth of the sprocket when the chain is engaging it and having their backs in engagement with said sprocket teeth.

16. In combination, a sprocket having teeth thereon, a chain comprising a plurality of pitches of links, the links in one pitch having all teeth extending in one direction from the longitudinal center of the chain and adapted to rest astride one of said sprocket teeth, and the links in adjoining pitches having all teeth extending in the opposite direction from said longitudinal center and disposed between adjacent teeth of the sprocket when the chain is engaging it.

17. In combination, a sprocket having teeth thereon, a chain comprising a plurality of pitches of toothed links, all the teeth in one pitch extending in one direction from the longitudinal center of the chain and adapted to rest astride one of said sprocket teeth, and all the teeth in adjoining pitches lying between adjacent teeth of the sprocket when the chain is engaging it.

18. A chain composed of links arranged in articulated pitches, each pitch being composed of a plurality of toothed links, all the teeth in one pitch being adapted to rest astride the same sprocket tooth, and said chain having all the teeth in pitches adjacent said first-named pitch lying on the side of the longitudinal center of the chain opposite those in said first-named pitch.

WARREN J. BELCHER.
RICHARD F. DOW.